(12) United States Patent
Kotelnikov et al.

(10) Patent No.: US 10,520,591 B2
(45) Date of Patent: *Dec. 31, 2019

(54) LIDAR SYSTEM COMPRISING A SINGLE-PHOTON DETECTOR

(71) Applicant: Princeton Lightwave, Inc., Cranbury, NJ (US)

(72) Inventors: Evgenii Yuryevich Kotelnikov, Princeton, NJ (US); William Paul Mordarski, Colts Neck, NJ (US); Igor Kudryashov, Pennington, NJ (US); Mark D. Entwistle, Feasterville-Trevose, PA (US); Sabbir Sajjad Rangwala, West Windsor, NJ (US)

(73) Assignee: ARGO AI, LLC, Pittsburgh, PA (US)

( * ) Notice: Subject to any disclaimer, the term of this patent is extended or adjusted under 35 U.S.C. 154(b) by 413 days.

This patent is subject to a terminal disclaimer.

(21) Appl. No.: 15/452,182

(22) Filed: Mar. 7, 2017

(65) Prior Publication Data

US 2017/0176576 A1 Jun. 22, 2017

Related U.S. Application Data

(63) Continuation of application No. 14/147,478, filed on Jan. 3, 2014, now Pat. No. 9,625,580.

(51) Int. Cl.
*G01C 3/08* (2006.01)
*G01S 7/487* (2006.01)
(Continued)

(52) U.S. Cl.
CPC ............ *G01S 7/487* (2013.01); *G01S 17/107* (2013.01); *G01S 17/42* (2013.01); *G01S 17/89* (2013.01)

(58) Field of Classification Search
CPC ........ G01S 7/487; G01S 17/42; G01S 17/107; G01S 17/89; G01S 17/023; G01S 17/66; G01S 7/4817; G05D 1/0088; G05D 2201/0213

See application file for complete search history.

(56) References Cited

U.S. PATENT DOCUMENTS

| 6,421,033 B1 | 7/2002 | Williams et al. |
| 2010/0020306 A1 | 1/2010 | Hall |

(Continued)

OTHER PUBLICATIONS

Ito, et al, "System design and performance aracterization of a MEMS-based laser scanning time-of-flight sensor based on a 256x64-pixel single-photon imager", 2013, pp. 1-15, Publisher: IEEE; Applied Optics Lab., Toyota Central R&D Labs, Inc.

(Continued)

*Primary Examiner* — Samantha K Abraham
(74) *Attorney, Agent, or Firm* — Kaplan Breyer Schwarz, LLP

(57) ABSTRACT

A method for developing a map of objects in a region surrounding a location is disclosed. The method includes interrogating the region along a detection axis with a series of optical pulses and detecting reflections of the optical pulses that originate at objects located along the detection axis. A multi-dimensional map of the region is developed by scanning the detection axis about the location in at least one dimension. The reflections are detected via a single-photon detector that is armed using a sub-gating scheme such that the single-photon detector selectively detects photons of reflections that originate only within each of a plurality of zones that collectively define the detection field. In some embodiments, the optical pulses have a wavelength within the range of 1350 nm to 1390 nm, which is a spectral range having a relatively high eye-safety threshold and a relatively low solar background.

21 Claims, 8 Drawing Sheets

(51) Int. Cl.
*G01S 17/89* (2006.01)
*G01S 17/10* (2006.01)
*G01S 17/42* (2006.01)

(56) References Cited

U.S. PATENT DOCUMENTS

2011/0216304 A1  9/2011  Hall
2013/0099922 A1  4/2013  Lohbihler
2015/0009485 A1  1/2015  Mheen et al.

OTHER PUBLICATIONS

Niclass, et al, "Design and characterization of a 256x64-pixel single-photon imager in CMOS for a MEMS-based laser scanning time-of-flight sensor", "Optics Express", May 10, 2012, pp. 11863-11881, vol. 20, No. 11, Publisher: Optical Society of America.
Charbon et al., "SPAD-Based Sensors", F. Remondino and D. Stoppa (eds.), TOF Range-Imaging Cameras, DOI:10.1007/978-3-642-27523-4_2, Springer-Verlag Berlin Heidelberg 2013.
Optics and Photonics, "Seeing in the Dark: Defense Applicationsof IR imaging dated Apr. 2011", http://www.osa-opn/home/articles/volume_22/issue_4/features/seeing_in_the_dark_defense_applications_of_ir_ima/, vol. 22 issue 4.
"Final Office Action" issued in parent U.S. Appl. No. 14/147,478, dated May 5, 2016.
"Notice of Allowance" issued in parent U.S. Appl. No. 14/147,478, dated Feb. 7, 2017.
"Non-Final Office Action" issued in parent U.S. Appl. No. 14/147,478, dated Dec. 6, 2015.
"Non-Final Office Action" issued in parent U.S. Appl. No. 14/147,478, dated Dec. 19, 2016.

LIDAR SYSTEM COMPRISING A SINGLE-PHOTON DETECTOR

CROSS REFERENCE TO RELATED APPLICATIONS

This case is a continuation of co-pending U.S. patent application Ser. No. 14/147,478 filed Jan. 3, 2014, which is incorporated herein by reference in its entirety.

FIELD OF THE INVENTION

The present invention relates to laser range finding in general, and, more particularly, to LiDAR.

BACKGROUND OF THE INVENTION

Light Detection And Ranging (LiDAR) systems are attractive for use in many applications, such as driverless automobiles, farm equipment, and the like. Laser range finding is used to determine the range from a source to an object by sending a pulse of light in the direction of the object, detecting a reflection of the pulse, and determining the time required for the light to travel to and return from the object (i.e., its time-of-flight).

A typical prior-art LiDAR system creates a local map around a vehicle by performing laser range finding in several directions and elevations around the vehicle. Prior-art systems accomplish this in different ways, such as using an array of laser sources, rotating a single laser source about an axis through the vehicle, or directing the output signal from a single source about the vehicle using a rotating mirror or prism, or a stationary reflective cone. For example, U.S. Patent Publication No. 20110216304 describes a LiDAR system based on a vertically oriented array of emitter/detector pairs that are rotated about an axis to provide a 360° horizontal field-of-view (FOV) and vertical FOV of several tens of degrees. This system emits multiple pulses at a high repetition rate while the emitter/detector assembly is scanned about the vehicle. The resultant distance measurements form the basis for a three-dimensional simulated image of the scene around the vehicle.

The requirements for a LiDAR system used in automotive applications are quite challenging. For instance, the system needs to have a large FOV in both the horizontal and vertical directions, where the FOV is supported over a distance that ranges from approximately 5 meters (m) to approximately 300 m. Further, the system must have high resolution, as well as an ability to accommodate a changing environment surrounding a vehicle that could be travelling at relatively high speed. As a result, the system needs to be able to update the simulated environment around the vehicle at a high rate. In addition, an automotive LiDAR system needs to be able to operate at both day and night. As a result, the system needs to accommodate a wide range of ambient light conditions.

The need for high-resolution performance would normally dictate the use of high laser power to ensure sufficient return signal from objects as far away as 300 m. Unfortunately, eye safety considerations limit the laser power that can be used in a LiDAR system. The safety threshold for the human eye is a function of wavelength, with longer wavelengths being, in general, safer. For example, the Maximum Permissible Energy (MPE) for a nanosecond-range light pulse is approximately six orders of magnitude higher at 1550 nanometers (nm) than at 980 nm. Unfortunately, the solar background is quite high at 1550 nm and can degrade measurement sensitivity in this wavelength regime. As a result, many prior-art LiDAR systems operate in the wavelength range from approximately 800 nm to approximately 1050 nm at low optical power levels, thereby sacrificing system performance.

Some prior-art LiDAR systems do operate 1550 nm; however, FOV is normally restricted to mitigate the effects of the solar background radiation. Unfortunately, such an operational mode reduces the update rate for the system. To develop a sufficiently large image of the surrounding region, therefore, multiple systems having overlapping fields of view are required, which increases overall cost and system complexity.

For these reasons, a low-cost, high-performance LiDAR system suitable for vehicular applications would represent a significant advance in the state-of-the-art.

SUMMARY OF THE INVENTION

The present invention enables a LiDAR system without some of the costs and disadvantages of the prior art. Embodiments of the present invention are particularly well-suited for use in applications such as autonomous vehicles, adaptive automotive cruise control, collision-avoidance systems, and the like.

An illustrative embodiment of the present invention is a LiDAR system comprising a transmitter and a single-photon detector, where transmitter provides nanosecond-scale optical pulses that are in a wavelength range from approximately 1350 nm to approximately 1390 nm. Operation in this wavelength regime exploits an MPE that is several orders of magnitude higher than at the 905 nm wavelength typically used in prior-art LiDAR systems. Also, by operating in this wavelength range, embodiments of the present invention can also take advantage of a narrow wavelength band in which the solar background is relatively low. In order to enable an FOV that extends to a distance of 500 m, the single-photon detector is gated at a frequency of approximately 3.3 MHz, yielding a series of 0.3 microsecond detection frames.

To further reduce the impact of solar-background-induced noise, in some embodiments, the single-photon detector is operated in a "range-gated" mode. In such operation, each detection frame includes a plurality of sub-gate periods, each including a different portion of the detection frame. The single-photon detector is armed at the beginning of each sub-gate period and disarmed at the end of each sub-gate period. As a result, each of the sub-gate periods corresponds to a longitudinal slice of the detection field. By cycling through a series of detection frames, each including the plurality of sub-gate periods, the present invention enables high signal-to-noise operation with high resolution over the entire field-of-view. By using short sub-gate periods, the probability of detecting a noise photon associated with the solar background in any individual sub-gate period is dramatically reduced.

In some embodiments, the results from multiple detection frames are processed using statistical analysis techniques to reduce the impact of the receipt of noise photons. In some embodiments, the results from multiple detection frames are collected in a dataset and digital thresholding is applied to the dataset to mitigate the effects of background noise.

An embodiment of the present invention comprises a method for developing a map of objects relative to a first location, the method comprising: transmitting a first optical pulse at a first time, the first optical pulse having a wavelength within the range of approximately 1350 nm to approximately 1390 nm; detecting a first reflection of the first optical pulse from a first object within the detection field, wherein the first reflection is detected at a second time; and computing a distance between the first location and the first object based on the difference between the first time and the second time.

DETAILED DESCRIPTION

Figure 1:
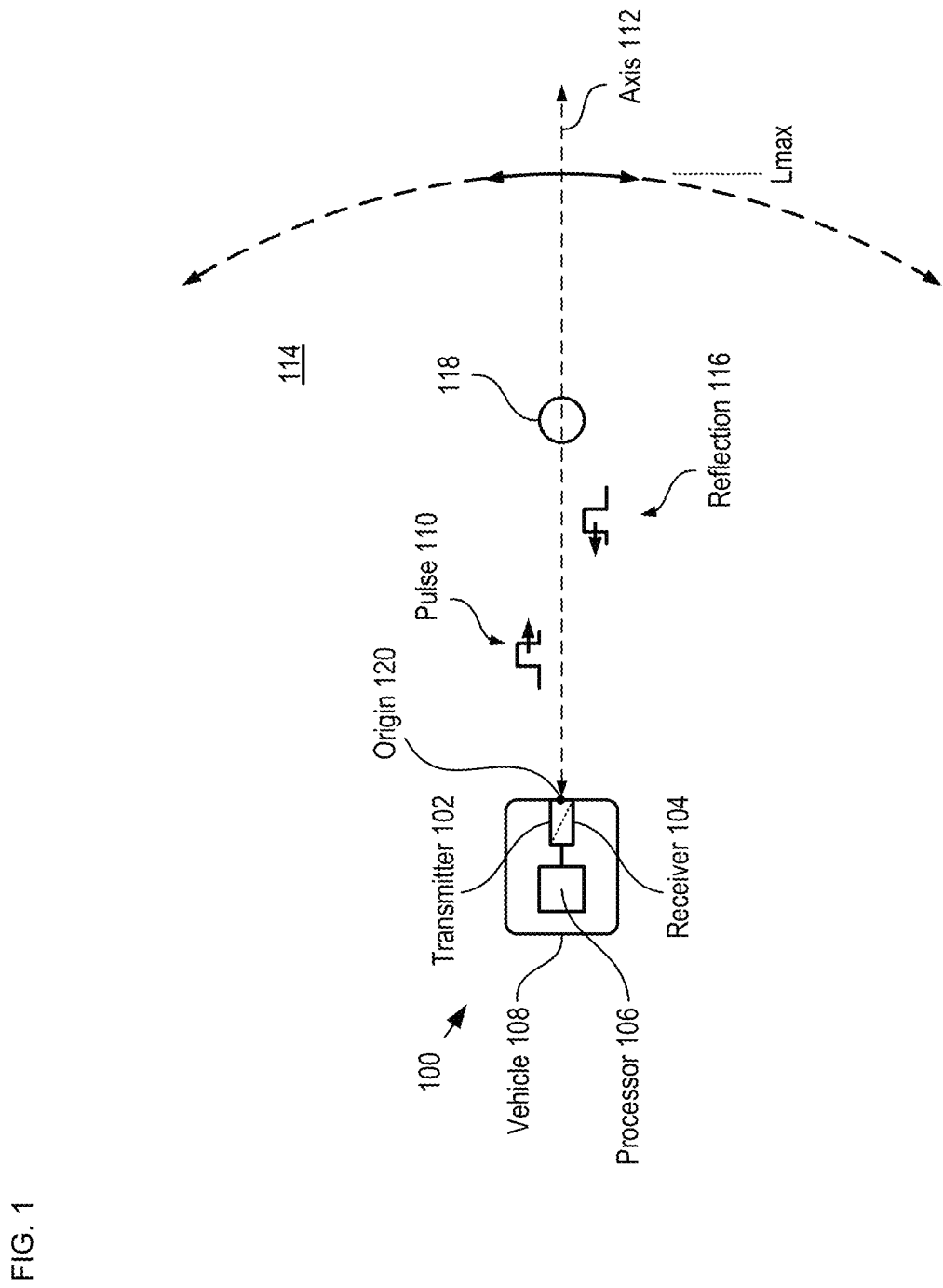
FIG. 1 depicts a schematic drawing of a LiDAR system in accordance with the illustrative embodiment of the present invention.

FIG. 1 depicts a schematic drawing of a LiDAR system in accordance with the illustrative embodiment of the present invention. System 100 includes transmitter 102, receiver 104, and processor 106.

Figure 2:
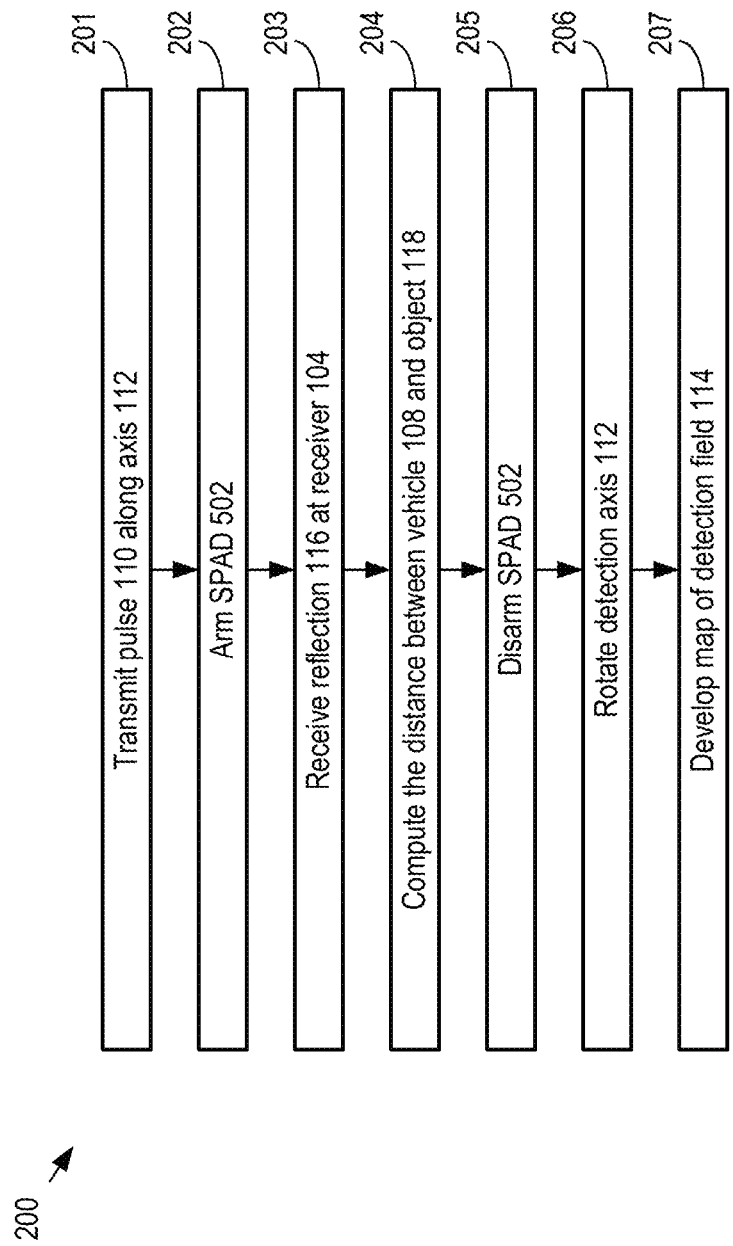
FIG. 2 depicts operations of a method for developing a map of objects in a detection field in accordance with the illustrative embodiment of the present invention.

FIG. 2 depicts operations of a method for developing a map of objects in a detection field in accordance with the illustrative embodiment of the present invention. Method 200 begins with operation 201, wherein transmitter 102 transmits a train of pulses 110 along detection axis 112.

Transmitter 102 is an optical transmitter suitable for emitting a train of optical pulses having a wavelength within the range of approximately 1350 nm to approximately 1390 nm. Typically transmitter 102 generates the optical pulses using a laser source, such as a diode laser.

One skilled in the art will recognize that the performance of a LiDAR system is based on several factors, such as available optical power, the sensitivity of the detector used to detect reflected pulses, and the desired sensitivity of the system. The present invention employs single-photon detectors, which greatly reduces the amount of optical power required in pulses 110. Significant optical power is still required to enable a suitable signal-to-noise ratio (SNR) for longer detection distances, however. Unfortunately, the amount of optical power that can be used in a LiDAR system is constrained by eye-safety issues. These are particularly stringent at shorter wavelengths, such as at 905 nm, a typical operating wavelength of prior-art LiDAR systems.

It is an aspect of the present invention that operation at a wavelength within the 1350-1390 nm-wavelength range enables embodiments of the present invention to take advantage of a relatively narrow intensity dip in the solar background spectrum. This wavelength range also exploits an eye-safety threshold that is more than an order of magnitude higher than at 905 nm.

Figure 3:
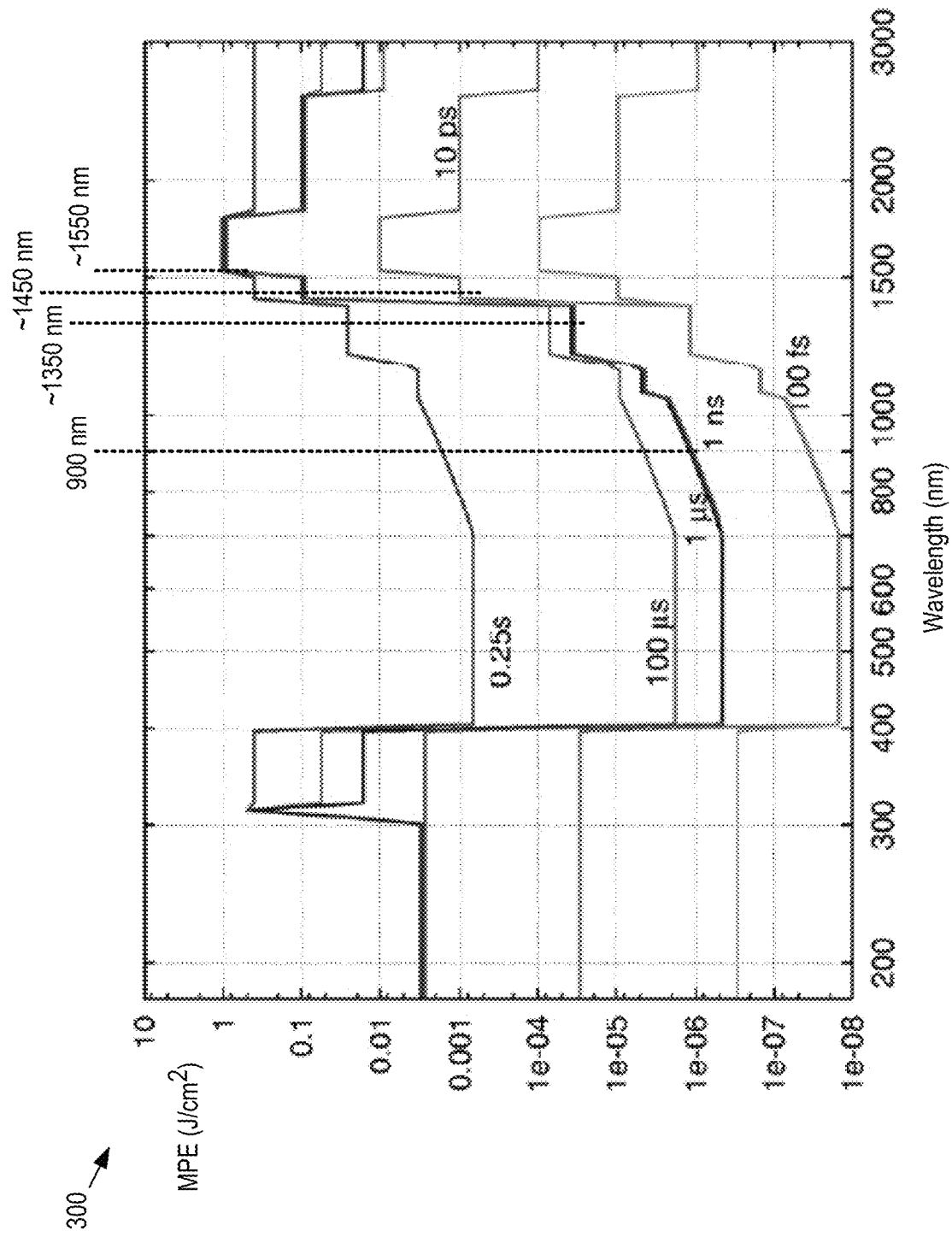
FIG. 3 depicts a plot of Maximum Permissible Energy (MPE) versus wavelength for pulses having different pulse widths.

FIG. 3 depicts a plot of Maximum Permissible Energy (MPE) versus wavelength for pulses having different pulse widths. One skilled in the art will recognize that the MPE denotes an eye-safety threshold for the power at which a LiDAR system can safely operate.

It is apparent from plot 300 that, for nanosecond pulse widths, MPE is approximately 1 microJoule/cm$^2$ at a wavelength of 900 nm; however, it increases to approximately 50, 5000, and $10^6$ microJoules/cm$^2$ at the wavelengths of 1350, 1450, and 1550 nm, respectively. By operating at longer wavelengths, therefore, system 100 can provide higher laser power without exceeding the eye safety threshold.

It should be noted that plot 300 also suggests that operation at 1550 nm should enable even longer ranging distance, as well as improved system performance. Unfortunately, the solar background radiation is also higher at 1550 nm wavelengths, thereby degrading the signal-to-noise ratio and negating many of the benefits of long-wavelength operation.

Figure 4:
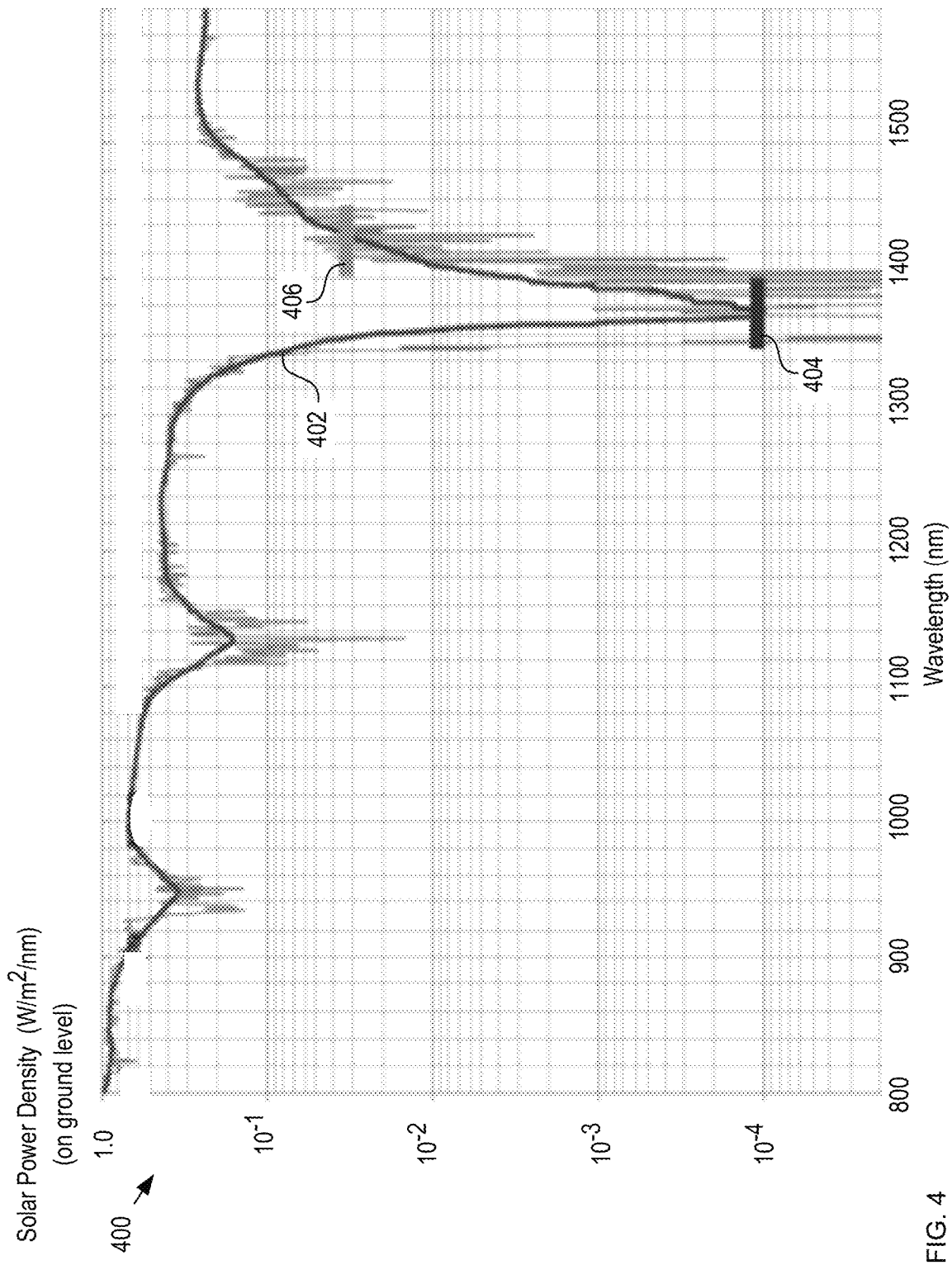
FIG. 4 depicts a plot of solar power density as a function of wavelength.

FIG. 4 depicts a plot of solar power density as a function of wavelength.

While plot 400 evinces that the power level of the solar background is quite high at 1550 nm, it also shows that it dips significantly within the range of approximately 1340 nm to approximately 1500 nm. Trace 402 indicates a sliding 40 nm-wide average of the solar energy. Window 404 denotes a 40 nm-wide wavelength window suitable for vehicular LiDAR operation, which is centered at 1370 nm in accordance with the illustrative embodiment of the present invention. It should be noted that other operational windows are in accordance with the present invention. For example, plot 400 also depicts window 406, centered at approximately 1455 nm, which represents another possible window of operation for system 100. Operation in this wavelength regime allows pulse 110 to be at a higher energy level by virtue of a higher MPE at this higher wavelength.

Transmitter 102 transmits each of pulses 110 such that it has a duration of approximately 5 nanoseconds at a repetition rate of approximately 300 kHz. In some embodiments, each of pulses 110 is transmitted with a duration that is less than 5 ns. In some embodiments, each of pulses 110 is transmitted with a duration that is greater than 5 ns. One skilled in the art will recognize that the pulse width of pulse 110 and the repetition rate of transmitter 102 are matters of design and can that pulse 110 can have any suitable values.

In the illustrative embodiment, the repetition rate of transmitter 102 is based on the desired maximum range of detection, Lmax, in detection field 114 (i.e., the size of detection field 114). In the illustrative embodiment, transmitter 102 transmits a train of pulses 110 at a repetition rate of 3.3 microseconds, which is based on the time-of-flight for a photon travelling to and from an object that is at a maximum detection distance that is approximately 500 meters from receiver 104. This time-of-flight also determines the duration of each of a plurality of detection frames for system 100, as discussed below and with respect to FIG. 5.

It should be noted that, in the illustrative embodiment, system 100 is mounted on vehicle 108 such that transmitter 102 and receiver 104 are substantially co-located. In some embodiments, transmitter 102 and receiver 104 are not co-located and are separated by some separation distance and the repetition rate of transmitter 102 is based on the total time for a photon to travel from transmitter 102 to an object located at Lmax and be reflected back to receiver 104.

At operation 202, processor 106 enables receiver 104 to detect reflection 116.

Figure 5:
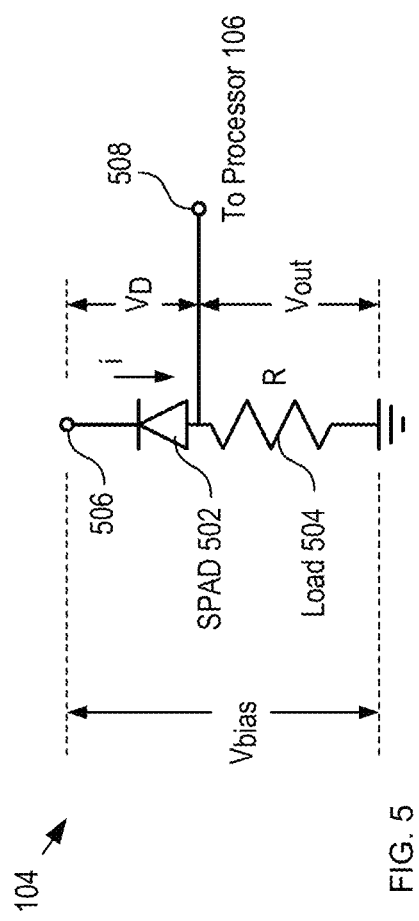
FIG. 5 depicts a circuit diagram of a portion of a receiver in accordance with the illustrative embodiment of the present invention.

FIG. 5 depicts a circuit diagram of a portion of a receiver in accordance with the illustrative embodiment of the present invention. Receiver 104 comprises single-photon avalanche diode (SPAD) 502 and load 504. In some embodiments, receiver 104 includes a negative-feedback avalanche diode (NFAD), a SPAD operatively coupled with a switching element (e.g., a transistor) operative for discharging the SPAD after an avalanche event, a photodiode operating in linear mode, or another suitable photodiode. SPADs and NFADs suitable for use in the present invention are described in detail in U.S. Pat. Nos. 7,378,689 and 7,719,029, each of which is incorporated herein by reference.

Figure 6:
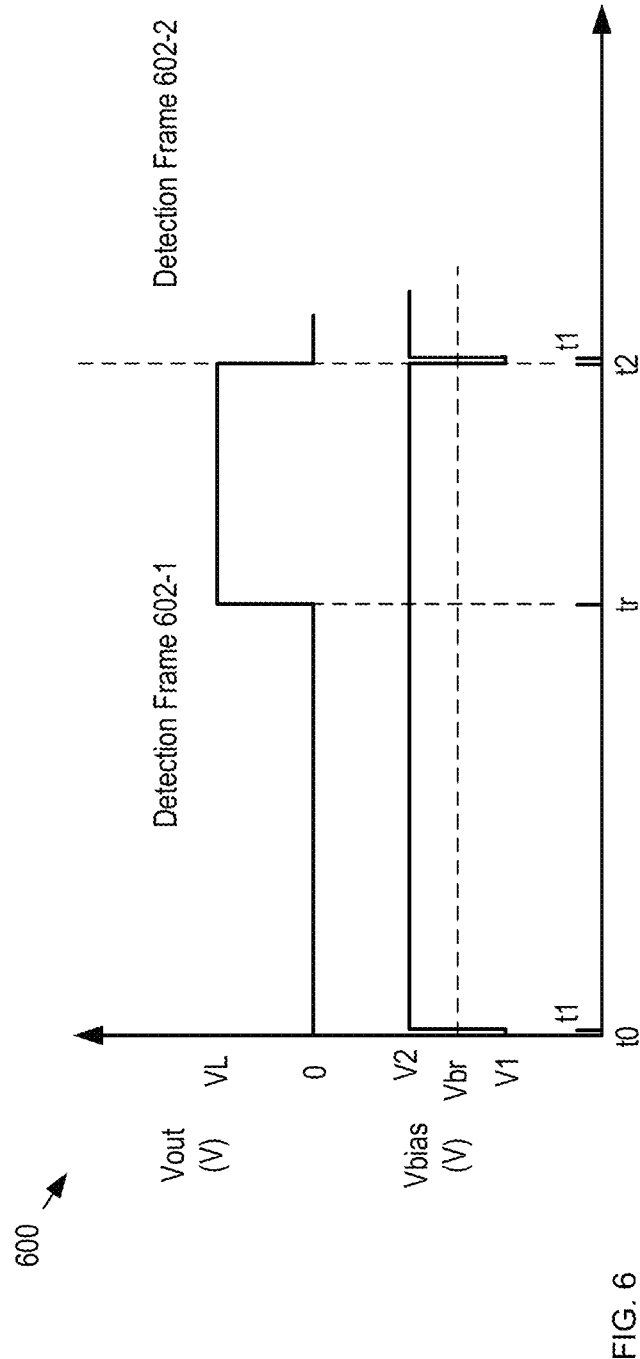
FIG. 6 depicts a timing diagram for receiver operation of a LiDAR system in accordance with the illustrative embodiment of the present invention.

FIG. 6 depicts a timing diagram for receiver operation of a LiDAR system in accordance with the illustrative embodiment of the present invention. Each detection frame depicted in timing diagram 600 (i.e., detection frame 602-1) begins at time t0, when transmitter 102 transmits pulse 110.

At time t1, processor 106 arms SPAD 502 by applying a voltage bias, V2, at terminal 506, where V2 exceeds breakdown voltage Vbr of SPAD 502. For the purposes of this Specification, including the appended claims, "arming" a SPAD is defined as putting the diode into Geiger mode by biasing it with a bias voltage that exceeds the breakdown voltage of the SPAD. One skilled in the art will recognize that when armed, receipt of a single photon will give rise to an avalanche event that results in a macroscopically detectable current through the SPAD. In similar fashion, "disarming" a SPAD is defined taking it out of Geiger mode by reducing its bias voltage below the breakdown voltage of the SPAD. It should be noted that time t1 is delayed slightly from time t0 to account for the transmission duration of pulse 110, during which detection of reflection 116 is disabled. In some embodiments, SPAD 502 is armed simultaneously with, or during, the transmission of pulse 110.

Prior to absorbing a photon, the entirety of Vbias is developed across SPAD 504 since the magnitude of avalanche current, i, is zero and there is no voltage drop across load 504. As a result, the magnitude of Vout (provided to processor 106 at terminal 508) is equal to zero. Although the illustrative embodiment comprises a load that is a resistive load, in some embodiments of the present invention, load 504 comprises a circuit element in addition to or other than a resistor, such as a capacitor, inductor, or reactive element (e.g., a transistor, etc.).

At operation 203, receiver 104 detects reflection 116, which originates from object 118. Reflection 116 is detected at receiver 104 at time tr.

Upon absorbing a photon, avalanche current, i, builds through SPAD 502 and load 504. As a result, a voltage drop equal to i·R will appear across load 504, where R is the resistance of load 504. As a result, processor 106 detects a change in the magnitude of voltage Vout, at time tr.

At operation 204, processor 106 computes the distance between vehicle 108 and object 118 based on the delay between times t0 and tr.

It should be noted that the use of an NFAD in receiver 104 enables detection of multiple reflections within a single detection frame, since an NFAD can be rapidly quenched and re-armed at rates higher than the typical repetition rate of transmitter 102, as discussed in detail in U.S. Pat. No. 7,719,029.

At operation 205, processor 106 disarms SPAD 502 at time t2 by reducing its bias voltage below Vbias. It should be noted that time t2 in detection frame 602-1 is also time t0 of detection frame 602-2.

In some embodiments, operations 201 through 205 are performed for each of detection frames 602-i, where i=1 through N and N is a desired number of detection frames over which it is desired to interrogate detection field 114 along detection axis 112. Repeated interrogation of the same detection axis enables the use of statistical methods to increase system tolerance for false counts at SPAD 502. In some embodiments, digital thresholding is used to increase system tolerance for false counts, as discussed below and with respect to FIGS. 7-10.

At operation 206, system 100 scans detection axis 112 horizontally such that system 100 interrogates a different portion of detection field 114. In some embodiments, system 100 scans detection axis 112 vertically. Typically, detection axis 112 is scanned via a rotating element, such as a mirror, prism, and the like. In some embodiments, transmitter 102 and receiver 104 are mounted on a scanning element, such as a turntable, gimbal element, etc., which enables detection axis 112 to be scanned.

In some embodiments, system 100 includes a one- or two-dimensional array of transmitters and/or receivers that are arranged to simultaneously interrogate detection field 114 along a plurality of detection axes arranged horizontally and/or vertically.

At operation 207, processor 106 develops a map of detection field 114.

It should be noted that even when system 100 operates at a wavelength within the range of 1350-1390 nm, the power level of the solar background is still quite high and can lead to false counts at receiver 104, as shown in Table 1 below.

TABLE 1

| Wavelength | Maximum Solar-Power Density on | False Photon Counts per Nanosecond | |
|---|---|---|---|
| Range (nm) | Ground Level (W/m²/nm) | High FOV Res. 0.075 deg | Low FOV Res. 0.15 deg |
| 905 ± 20 | 0.7 | 12 (2500 pW) | 46 (100000 pW) |
| 1370 ± 20 | $10^{-4}$ | 0.0025 (0.4 pW) | 0.01 (1.6 pW) |
| 1420 ± 20 | $2 \times 10^{-2}$ | 0.5 (72 pW) | 2 (290 pW) |

Although the false-count rate at 1370 nm is much lower than at other wavelengths, even at 1370 nm, 6-30 false counts will occur in a detection frame of approximately 3 microseconds.

It is another aspect of the present invention that the negative impact of solar background on system performance is mitigated by apportioning each detection frame into a plurality of sub-gate periods. In other words, by dividing each detection frame into smaller time intervals in which SPAD 502 is armed, the probability of a false count during each sub-gate period can be greatly reduced, as shown in Table 2 below.

TABLE 2

| | False Photon Counts per Sub-gate | |
|---|---|---|
| Sub-gate Periods Per 1 microsecond-long Detection Frame | High FOV Res. 0.075 deg | Low FOV Res. 0.15 deg |
| 20 (50 ns/sub-gate) | 0.1 | 0.5 |
| 50 (20 ns/sub-gate) | 0.05 | 0.2 |

Figure 7:
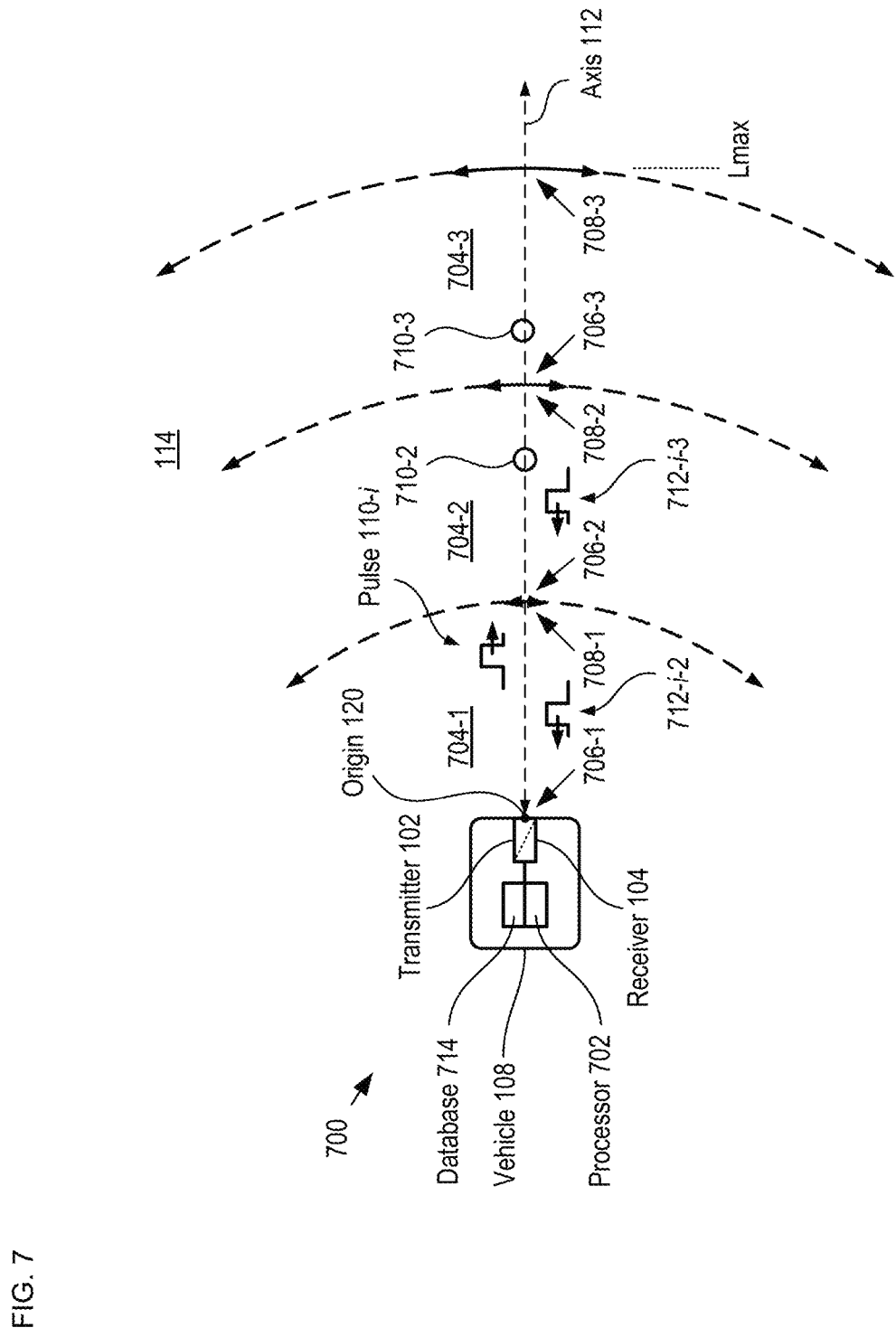
FIG. 7 depicts a schematic drawing of a LiDAR system in accordance with a first alternative embodiment of the present invention.

FIG. 7 depicts a schematic drawing of a LiDAR system in accordance with a first alternative embodiment of the present invention. System 700 is analogous to system 100; however, in operation, processor 702 is operative for logically separating detection field 114 into detection zones 704-1 through 704-3 (referred to, collectively, as zones 704)—each of which corresponds to a different sub-gate period within each detection frame. In the first alternative embodiment, detection field 114 is separated into three zones; however, it will be clear to one skilled in the art, after reading this Specification, how to specify, make, and use embodiments of the present invention wherein detection field 114 is separated into any practical number of zones.

Figure 8:
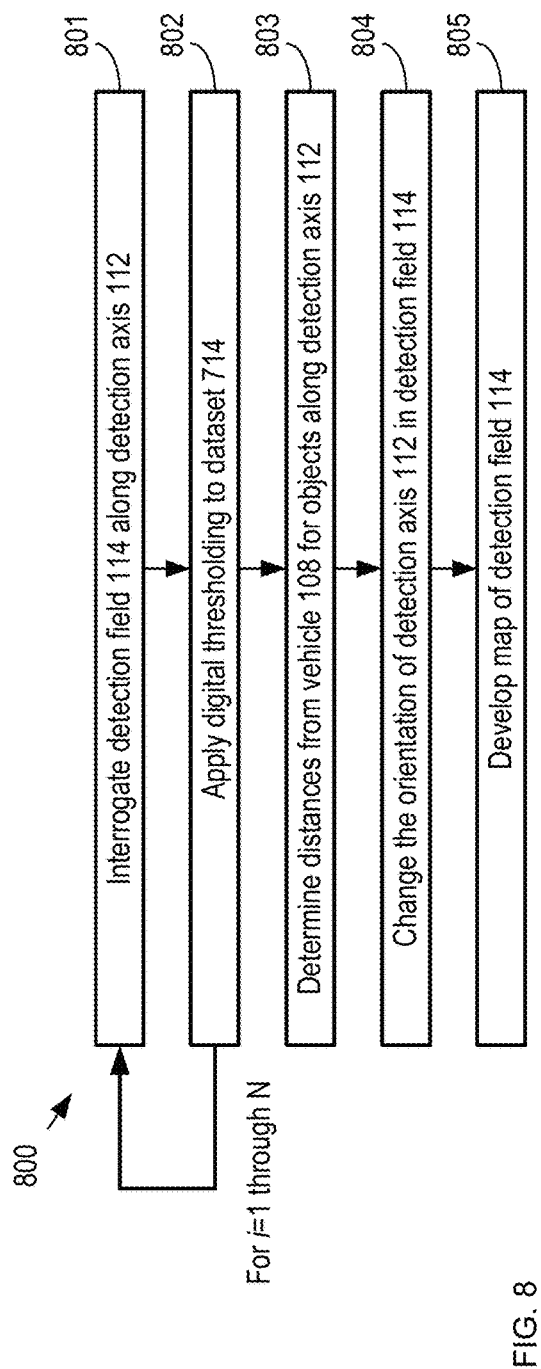
FIG. 8 depicts operations suitable for developing a map of a detection field in accordance with the first alternative embodiment of the present invention.

FIG. 8 depicts operations suitable for developing a map of a detection field in accordance with the first alternative embodiment of the present invention. Method 800 begins with operation 801, wherein, for each of i=1 through N, system 700 interrogates detection field 114 along detection axis 112 during detection frame 1002-i. N is the number of times interrogation of detection axis 112 is repeated before rotating detection axis 112 to enable system 100 to interrogate a different portion of detection field 114.

The value of N is based on a number of factors. For example, in any LiDAR system, it is important to be able to distinguish detection of a signal photon (i.e., a photon arising from reflection from an object in detection field 114) from a detected "noise photon" due to the solar background, a dark count, and the like. For proper system operation, a Probability of Detection (PD) of a signal photon is preferably at least 99%, while the false alarm rate (FAR) due to noise photons is preferably <1%. It is yet another aspect of the present invention that, by interrogating detection axis 112 repeatedly to collect data from multiple detection frames, statistical methods and/or digital thresholding can be employed to increase PD and decrease FAR, as discussed below.

Figure 9:
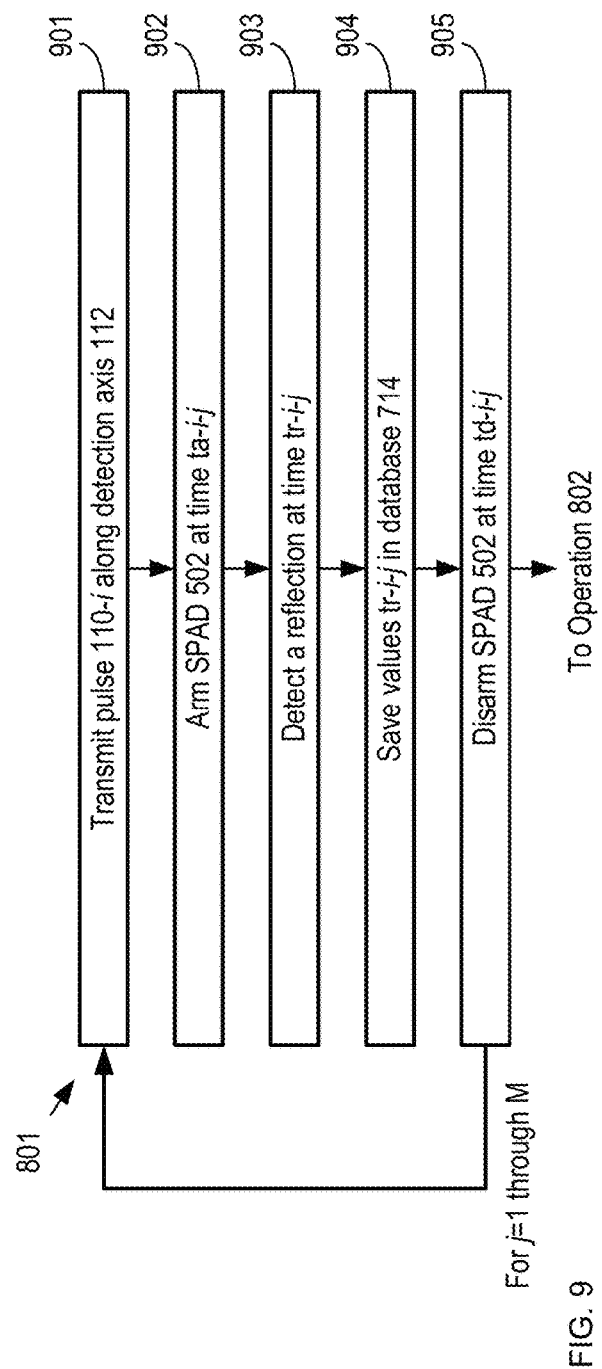
FIG. 9 depicts a sub-method suitable for interrogating a detection field along a detection axis in accordance with the first alternative embodiment of the present invention.

FIG. 9 depicts a sub-method suitable for interrogating a detection field along a detection axis in accordance with the first alternative embodiment of the present invention. Operation 801 begins with sub-operation 901, wherein transmitter 102 transmits pulse 110 along detection axis 112.

Figure 10:
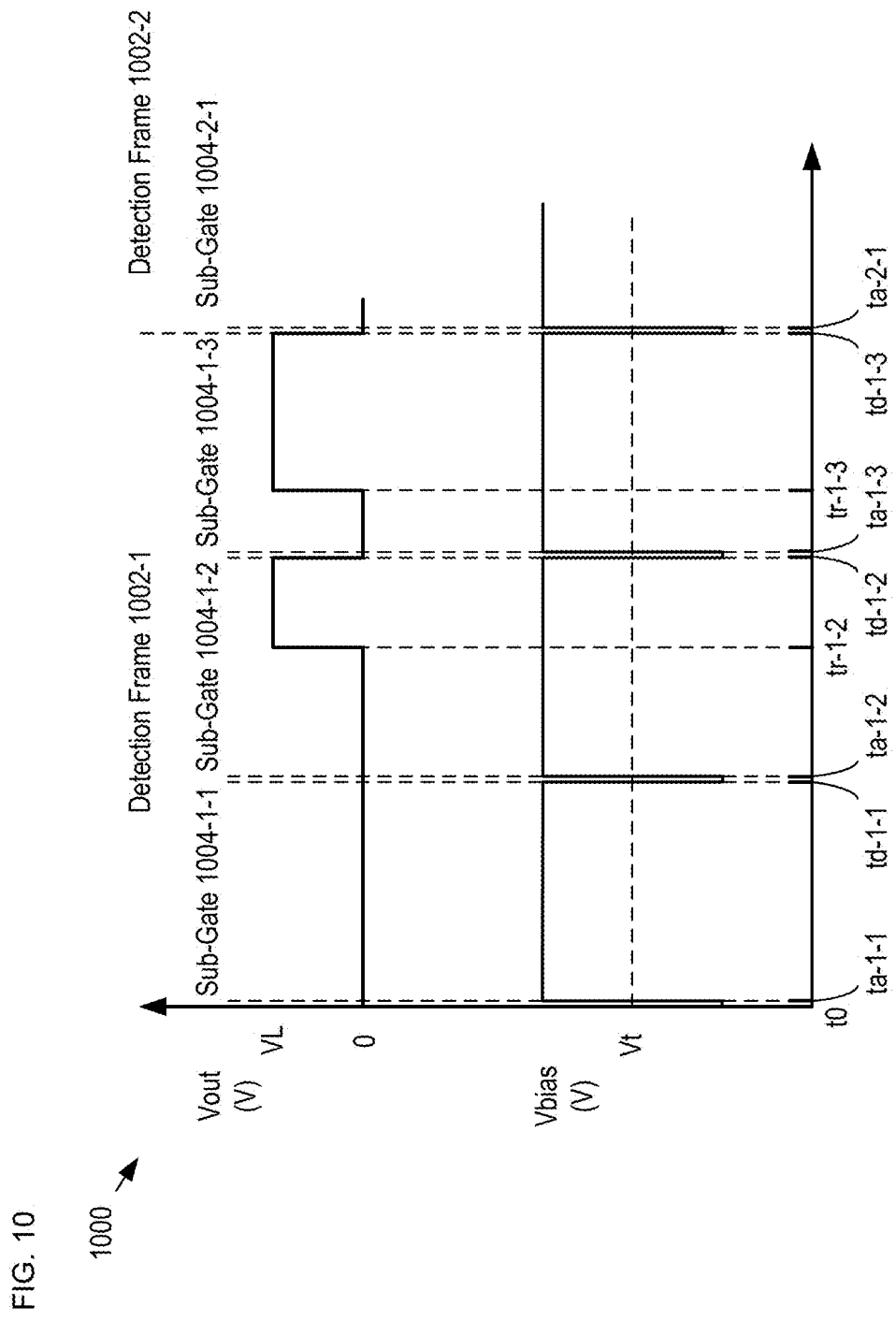
FIG. 10 depicts a timing diagram for interrogating a detection field along a detection axis in accordance with the first alternative embodiment of the present invention.

FIG. 10 depicts a timing diagram for interrogating a detection field along a detection axis in accordance with the first alternative embodiment of the present invention. In similar fashion to timing diagram 600 described above and with respect to FIG. 6, each measurement frame 1002-i begins at time t0-i, when transmitter 102 transmits pulse 110-i.

For each of j=1 through M, where M is the number of sub-gate periods within each detection frame, processor 106 enables receiver 104 to detect a reflection that originates only within zone 704-j.

Detection of a reflection originating within each zone 704-j is enabled at sub-operation 902, wherein SPAD 502 is armed at time ta-i-j. Time ta-i-j corresponds to the time-of-flight for a photon between vehicle 108 and point 706-j (i.e., from transmitter 102 to point 706-j and back to receiver 104), which is the point in zone 704-j nearest vehicle 108 on detection axis 112.

At sub-operation 903, reflection 712-j is detected at SPAD 502 at detection time tr-i-j. It should be noted that a reflection is not always detected from each zone 704. For example, in the example depicted in FIGS. 7-10, objects are located only in zones 704-2 and 704-3. As a result, no reflection is originated in zone 704-1 and Vout remains at zero volts throughout sub-gate period 1004-i-1.

At sub-operation 904, detection time tr-i-j is saved in memory at processor 702.

As discussed above and with respect to system 100, the use of an NFAD in receiver 104 enables detection of multiple reflections within a single detection frame, or in the case of system 700, within a single sub-gate period.

At sub-operation 905, SPAD 502 is disarmed at time td-i-j. Time td-i-j corresponds to the time-of-flight for a photon between vehicle 108 and point 708-j, which is the point in zone 704-j furthest from vehicle 108 on detection axis 112.

In some embodiments, SPAD 502 is not armed in each sub-gate period within each detection frame. For example, in some embodiments, a SPAD is armed only during a subset of the sub-gate periods (e.g., only during sub-gate period 1004-i-1) for a first plurality of detection frames and armed during a different subset of the sub-gate periods (e.g., only during sub-gate period 1004-i-2) for a second plurality of detection frames, and so on.

By dividing each detection frame into a plurality of sub-gate periods, embodiments of the present invention—particularly those embodiments that operate at a wavelength within the range of 1350 nm to 1390 nm—are afforded advantages over prior-art LiDAR systems that operate at other wavelengths because of a significant reduction in the probability of detecting a photon due to the solar background. For example, prior-art LiDAR systems operating at a wavelength of 905 nm struggle to overcome the effects of the solar background since their detectors are blinded by solar-based photons on a substantially continuous basis. Further, prior-art LiDAR systems that operate at longer wavelengths, such as 1550, typically must deal with solar background by restricting FOV of each pixel and/or by using very narrow bandwidth filters. For vehicular LiDAR, however, FOV requirements are high. As a result, more restricted-FOV pixels must be included to cover the same system-level FOV. In addition, it is challenging to provide cost-effective wavelength filters suitable for filtering out solar background, since the filter bandwidth cannot be narrower than the spectrum of the laser used to transmit pulses 110. Embodiments of the present invention avoid the need for restricted FOV as well as wavelength filters and, therefore, afford better system performance and lower cost.

Returning now to method 800, at operation 802, digital thresholding is applied to dataset 714. Digital thresholding enables an improvement in the Probability of Detection (PD) of a signal photon while also reducing the impact of "noise photons," such as detected photons arising from events other than reflection from an object (e.g., a solar background photon, dark count, and the like). The negative impact of noise photons on system performance is mitigated by setting a threshold value for the number of reflections detected from a zone during a plurality of detection frames (e.g., detections frame-1; through detection frame-N), and establishing a position for an object in that zone only when the number of reflections detected is equal to or greater than the threshold value.

The positive impact of applying digital thresholding to dataset 714 can be readily seen in Table 3 below.

TABLE 3

Data Collected Over 20 Detection Frames to Enhance SNR

| Threshold # of Frames Having a Photon Count | Maximum # of Noise Photons (FAR = 0.1) | Minimum # of Signal Photons (PD = 0.99) | Minimum Required SNR |
|---|---|---|---|
| 4 | 0.2 | 3 | 15 |
| 5 | 0.4 | 4 | 10 |
| 6 | 0.8 | 4 | 6.7 |
| 7 | 1.0 | 5 | 6.3 |
| 8 | 1.0 | 5 | 5 |
| 9 | 1.2 | 5.7 | 4.8 |
| 10 | 1.4 | 6.5 | 4.6 |
| 11 | 1.75 | 7.3 | 4.2 |
| 12 | 2.05 | 8.2 | 4 |
| 13 | 2.42 | 9.2 | 3.8 |
| 14 | 2.85 | 10.5 | 3.7 |
| 15 | 3.3 | 12 | 3.6 |

Careful examination of Table 3 shows that, for a solar background of approximately 0.5 photons, a threshold value of about 4 signal photons is required at receiver 104. Further, approximately 1 photon due to solar background can be tolerated with 5 signal photons at a threshold level of 8 detection frames where N=20. One skilled in the art will recognize that the threshold value is consideration of system design and desired performance and that the threshold value can be any value sufficient to achieve a desired system performance.

At operation 803, processor 106 computes the distance between vehicle 108 and objects located along detection axis 112.

At operation 804, system 700 rotates detection axis 112 to interrogate a different portion of detection field 114.

At operation 805, processor 106 develops a map of detection field 114.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method for developing a map of objects relative to a first location, the method comprising:
   transmitting a first optical pulse from a transmitter at a first time, the first optical pulse having a wavelength within the range of approximately 1350 nm to approximately 1475 nm;
   enabling a receiver to detect a first reflection only when it originates from within a first zone of a plurality thereof, wherein the plurality of zones collectively defines a detection field, and wherein the receiver is enabled to detect the first reflection by operations comprising:
   (i) providing the receiver such that it includes a single-photon detector;
   (ii) arming the single-photon detector at a third time, the third time being based on the time-of-flight for a photon travelling from the transmitter to the receiver via a first point in the first zone; and
   (iii) disarming the single-photon detector at a fourth time, the fourth time being based on the time-of-flight for a photon travelling from the transmitter to the receiver via a second point in the first zone;
   detecting the first reflection of the first optical pulse from a first object within the detection field, wherein the first reflection is detected at the receiver at a second time; and
   computing a distance between the first location and the first object based on the difference between the first time and the second time.

2. The method of claim 1, wherein the first optical pulse is transmitted along a first direction and the first point is the nearest point to the first location along the first direction and the second point is the furthest point to first location along the first direction.

3. The method of claim 1 further comprising enabling the receiver to detect the reflection only when it originates from within a second zone of the plurality thereof.

4. The method of claim 1 further comprising co-locating the transmitter and the receiver at the first location.

5. The method of claim 1 further comprising transmitting a second optical pulse from the transmitter at a third time, wherein the time between the first time and the third time is based the size of the detection field.

6. The method of claim 1 wherein the first optical pulse is transmitted such that it has a wavelength within the range of approximately 1350 nm to approximately 1420 nm.

7. The method of claim 1 wherein the first optical pulse is transmitted such that it has a wavelength within the range of approximately 1350 nm to approximately 1390 nm.

8. The method of claim 1 wherein the first optical pulse is transmitted such that it has a wavelength within the range of approximately 1435 nm to approximately 1475 nm.

9. A system comprising:
   a transmitter operative for providing an optical pulse from a first location at a first time, the optical pulse having a wavelength within the range of approximately 1350 nm to approximately 1475 nm;
   a receiver including a single-photon detector operative for detecting a reflection of the optical pulse from an object within a detection field at a second time; and
   a processor operative for:
   (i) logically separating the detection field into a plurality of detection zones that are arranged contiguously along an axis;
   (ii) establishing a detection frame having a start time that is based on the first time and a stop time based on a maximum distance of the detection field;
   (iii) establishing a plurality of sub-gate periods that collectively define the detection frame, wherein each sub-gate period corresponds to a different detection zone of the plurality thereof; and
   (iv) for each sub-gate period, enabling the receiver to detect the reflection only when it originates from its corresponding detection zone; and
   (v) estimating a separation distance between a second location and the object based the difference between the first time and the second time, wherein the second location is based on the first location.

10. The system of claim 9, wherein, for each sub-gate period, the processor enables the receiver to detect the reflection that originates from its corresponding detection zone by operations comprising:
    arming the single-photon detector at a third time that is based on a first position within the detection zone, the first position being a position along the axis that is closest to the first location; and
    disarming the single-photon detector at a fourth time that is based on a second position within the detection zone, the second position being a position along the axis that is furthest from the first location.

11. The system of claim 9 wherein each of the plurality of sub-gate periods has a duration based on a dimension of a zone of the plurality thereof, and wherein the dimension is a depth along a detection axis.

12. The system of claim 9 further comprising a scanner operative for enabling the transmitter to transmit the optical pulse along a detection axis, wherein the scanner is further operative for changing the orientation of the detection axis in at least one dimension.

13. The method of claim 9 wherein the optical pulse is provided such that it has a wavelength within the range of approximately 1350 nm to approximately 1420 nm.

14. The method of claim 9 wherein the optical pulse is provided such that it has a wavelength within the range of approximately 1350 nm to approximately 1390 nm.

15. The method of claim 9 wherein the optical pulse is provided such that it has a wavelength within the range of approximately 1435 nm to approximately 1475 nm.

16. A method for developing a map of objects within a detection field having a plurality of M detection zones that are contiguously arranged along a detection axis, the method including interrogating the detection axis by operations comprising:
   (1) establishing a first detection frame;
   (2) transmitting an optical pulse from a transmitter at a first location at a first time, the optical pulse being characterized by a wavelength within the range of approximately 1350 nm to approximately 1475 nm;
   (3) separating the detection field into M zones, zone-1 through zone-M; and
   (4) for each detection zone j, where j=1 through M,
      (a) enabling a receiver to detect a reflection-j of the optical pulse only when the reflection originates within zone j; and
      (b) if a reflection-j is detected at the receiver;
         (i) establishing a detection time-j based on the time when reflection-j is received; and
         (ii) computing a separation distance between an object j, the separation distance being based a difference between the first time and detection time j.

17. The method of claim 16 further comprising, for each detected reflection-j, establishing a position for object-j within the detection field.

18. The method of claim 16 further comprising providing the transmitter and receiver such that they are substantially co-located.

19. The method of claim 16 wherein the optical pulse is provided such that it has a wavelength within the range of approximately 1350 nm to approximately 1420 nm.

20. The method of claim 16 wherein the optical pulse is provided such that it has a wavelength within the range of approximately 1350 nm to approximately 1390 nm.

21. The method of claim 16 wherein the optical pulse is provided such that it has a wavelength within the range of approximately 1435 nm to approximately 1475 nm.

* * * * *